US007992700B2

(12) United States Patent
Thoonsen et al.

(10) Patent No.: US 7,992,700 B2
(45) Date of Patent: Aug. 9, 2011

(54) DEVICE FOR TREATING ELONGATE FOOD PRODUCTS WITH A CONDITIONED AIRFLOW

(75) Inventors: Paulus Johanus Maria Thoonsen, Vught (NL); Wilhelmus Johannes Everardus Maria Van Den Dungen, Veghel (NL)

(73) Assignee: Stork Townsend B.V., Oss (NL)

( * ) Notice: Subject to any disclaimer, the term of this patent is extended or adjusted under 35 U.S.C. 154(b) by 0 days.

(21) Appl. No.: 12/089,641

(22) PCT Filed: Sep. 25, 2006

(86) PCT No.: PCT/NL2006/050233
§ 371 (c)(1),
(2), (4) Date: Apr. 9, 2008

(87) PCT Pub. No.: WO2007/043880
PCT Pub. Date: Apr. 19, 2007

(65) Prior Publication Data
US 2008/0257683 A1    Oct. 23, 2008

(30) Foreign Application Priority Data

Oct. 14, 2005 (NL) ................................. 1030192

(51) Int. Cl.
*B65G 47/10* (2006.01)

(52) U.S. Cl. ........................... 198/370.08; 198/598
(58) Field of Classification Search .......... 198/370.01, 198/370.09, 430, 598
See application file for complete search history.

(56) References Cited

U.S. PATENT DOCUMENTS

| 1,980,411 | A |   | 11/1934 | Kimball et al. |
| 2,024,513 | A | * | 12/1935 | Diescher ................ 198/598 |
| 2,252,937 | A |   | 8/1941 | Link et al. |
| 2,512,083 | A | * | 6/1950 | Bardet ................... 198/598 |
| 4,057,138 | A | * | 11/1977 | Grebe ................ 198/370.08 |
| 5,052,542 | A |   | 10/1991 | Wipf et al. |
| 5,058,723 | A | * | 10/1991 | Hosch ................ 198/370.08 |
| 2002/0170442 | A1 |  | 11/2002 | Fessmann |
| 2003/0183087 | A1 |  | 10/2003 | Ahlberg |

FOREIGN PATENT DOCUMENTS

FR    2535579 A    5/1984

\* cited by examiner

*Primary Examiner* — James R Bidwell

(57) ABSTRACT

A device for transferring elongate food products, comprising: a carrier with a carrying surface for supporting a row of elongate food products, and a displaceable transfer means positioned at least partially above the carrier and provided with at least one contact surface for urging at least one elongate food product from the carrier. Also a method for transferring at least one elongate food product supplied on the carrying surface of a carrier is presented.

15 Claims, 3 Drawing Sheets

DEVICE FOR TREATING ELONGATE FOOD PRODUCTS WITH A CONDITIONED AIRFLOW

BACKGROUND OF THE INVENTION

The present invention relates to a device for transferring elongate food products according the preamble of claim 1. The invention also relates to a method for transferring at least one elongate food product supplied on the carrying surface of a carrier.

During the manufacture and processing of elongate food products, such as for instance sausages, these latter are usually held and/or displaced in a relative orientation placed successively in a row. Successive processing steps often require individual transfer or simultaneous transfer of a plurality of products. Food products (sausages) can thus be transferred individually or in groups (series) from a first carrying surface to a second carrying surface, for instance from a conveyor to a U-shaped carrier in which the food products can undergo a chemical and/or physical treatment, or for instance from a conveyor to a final packaging. The direction of transfer herein often lies perpendicularly of the feed and/or discharge direction of the food products. Particularly characteristic for elongate food products moreover is that they are usually vulnerable and can therefore only be externally loaded in limited measure. Yet another condition for the transfer of food products is that it must take place in hygienically controllable manner.

FR 2 535 579 discloses a device for elongating pieces of bread dough. The pieces of bread dough are transported from a pre-fermenting room to a carrier on which the pieces of dough placed longitudinally in a row. A transfer means moves the pieces of dough subsequently in a direction perpendicular to the transporting direction of the carrier to a traditional shaping device, in which the final shape is realised. The transfer means as shown is provided with a rotating blade that is activated by photoelectric cells placed close to the carrier for detecting the dough pieces passing. A disadvantage of the transfer means as disclosed in this application is that it is only applicable for relatively higher products as lower products can not moved far enough by the rotating blade. The device is therefore not suited for the processing of elongated food products like e.g. sausages. Another disadvantage is that the rotating blade has to be driven with a considerable speed; this can be one of the grounds why the transfer of the dough pieces is few controllable.

The object of the present invention is to provide a structurally simple transfer means which can transfer elongate food products in reliable manner without the limitations according the prior art.

SUMMARY OF THE INVENTION

The invention provides for this purpose a device of the type stated in the preamble, wherein the carrying surface of the carrier has the form of a segment of a circle perpendicularly of the rotation axis. The rotation axis can consist of an imaginary rotation axis but can also consist of a rotation shaft that is physically present. A contact surface preferably extends radially relative to the rotation axis. Due to the present invention the products can be displaced over the carrying surface in part of the displacement path without problems during transfer. Particularly when the (virtual) axis of the circle segment-shaped carrying surface coincides with the rotation axis of the transfer means, the mutual distance between the contact surface and the carrying surface remains constant at the position of the circle segment-shaped part of the carrying surface; the height of the products to be moved are thus no restriction anymore for the transfer means. Another advantage is that the stability op the position of the elongated food products during transfer increases.

In a preferred variant the transfer means is provided with a plurality of contact surfaces extending radially in different directions relative to a common rotation axis. Two, three, four or even more than four contact surfaces can thus extend around the rotation axis. After a limited angular displacement for the transfer of one or more elongate food products, a following contact surface is again then situated in a position where a subsequent food product, or a row of elongate food products, can be engaged for the purpose of transfer. For simple operation it is desirable here that the mutual angle between the successive contact surfaces extending radially from the common rotation axis is identical. It is thus always possible for a subsequent food product, or a subsequent row of food products, to be engaged and transferred with the same angular displacement (for instance in the case of two contact surfaces $\pi$ radials of 180°).

The carrier can be formed by a feed conveyor for longitudinal displacement of elongate food products. Such a conveyor belt is usually endless. According to the prior art food products are often displaced in longitudinal direction with such a conveyor belt. It is precisely the co-action of such a conveyor belt with a rotatable transfer means that can be realized in very simple and effective manner.

In order to now ensure that during each transfer operation a correct quantity of the food products is removed from the belt, it is desirable to synchronize the drive of the transfer means and the drive of the feed conveyor. It is otherwise noted that the elongate food products can be removed from a conveyor belt but can subsequently also be set down again onto such a belt. During transfer one elongate product can be transferred at each processing stroke, but it is also possible for a plurality of elongate food products lying in line to be transferred simultaneously with a single movement of the transfer means in a manner such that the relative orientation of the products for transfer is retained.

It is simplest if the least one contact surface is displaceable in only one direction of rotation. Through revolving thereof the contact surfaces will always come to lie in a new starting position for renewed engagement and transfer of elongate food products. Conversely, it is also possible for the at least one contact surface to be displaceable in two rotation directions. In such a situation an elongate food product (or a row of a plurality of food products lying in line) can always be engaged and transferred with different sides (remote from each other) of a contact surface as a result of rotation in two directions. With rotation in a single direction the food products are here always transferred to the same side of the carrier, while this is not the case with an intermittent rotation. The food products are then usually always urged to different sides of the carrier. A simple reliable drive of the transfer means is for instance an electric motor.

In a further preferred embodiment the device is also provided with collecting means for collecting elongate food products urged from the carrier by the transfer means. Such collecting means can for instance be formed by elongate baskets manufactured from an air-permeable material, which baskets are connected to at least one endless conveyor. The use of baskets to transport elongate food products is already known in the prior art, although the transfer means according to the present invention makes it possible to set down food products in the already existing baskets in very efficient and effective manner. In yet another embodiment variant, the collecting means are provided with a downward tapering top side. A transferred product (urged from the carrier by the contact surface) is then collected and simultaneously positioned in precise manner, at least for most degrees of freedom of the transferred food product.

The invention also comprises an individual transfer means such as forms part of the above described device. For the advantages of such a transfer means, which can be readily applied with diverse types of carriers, which may or may not already exist, for elongate food products, reference is made to the above described device for transferring elongate food products.

The present invention also provides a method for transferring elongate food products of the type stated in the preamble, wherein the method comprises a processing step B) of: urging at least one of a row of supplied food products in a lateral direction from the carrying surface by means of a pivotable transfer means, wherein a contact surface of the transfer means makes a pivoting movement around an axis of rotation, which axis of rotation is parallel to the row of elongate food products lying on the carrier. The transfer means can only be moved in a single rotation direction around the axis of rotation for successive transfer operations, although it is also possible as alternative for the transfer means to be moved in opposing directions. Once the food products have been urged from the carrier, they can optionally also be collected by collecting means and positioned.

BRIEF DESCRIPTION OF THE DRAWINGS

The present invention will be further elucidated on the basis of the non-limitative exemplary embodiments shown in the following figures. Herein.

DETAILED DESCRIPTION OF A PREFERRED EMBODIMENT OF THE INVENTION

Figure 1:
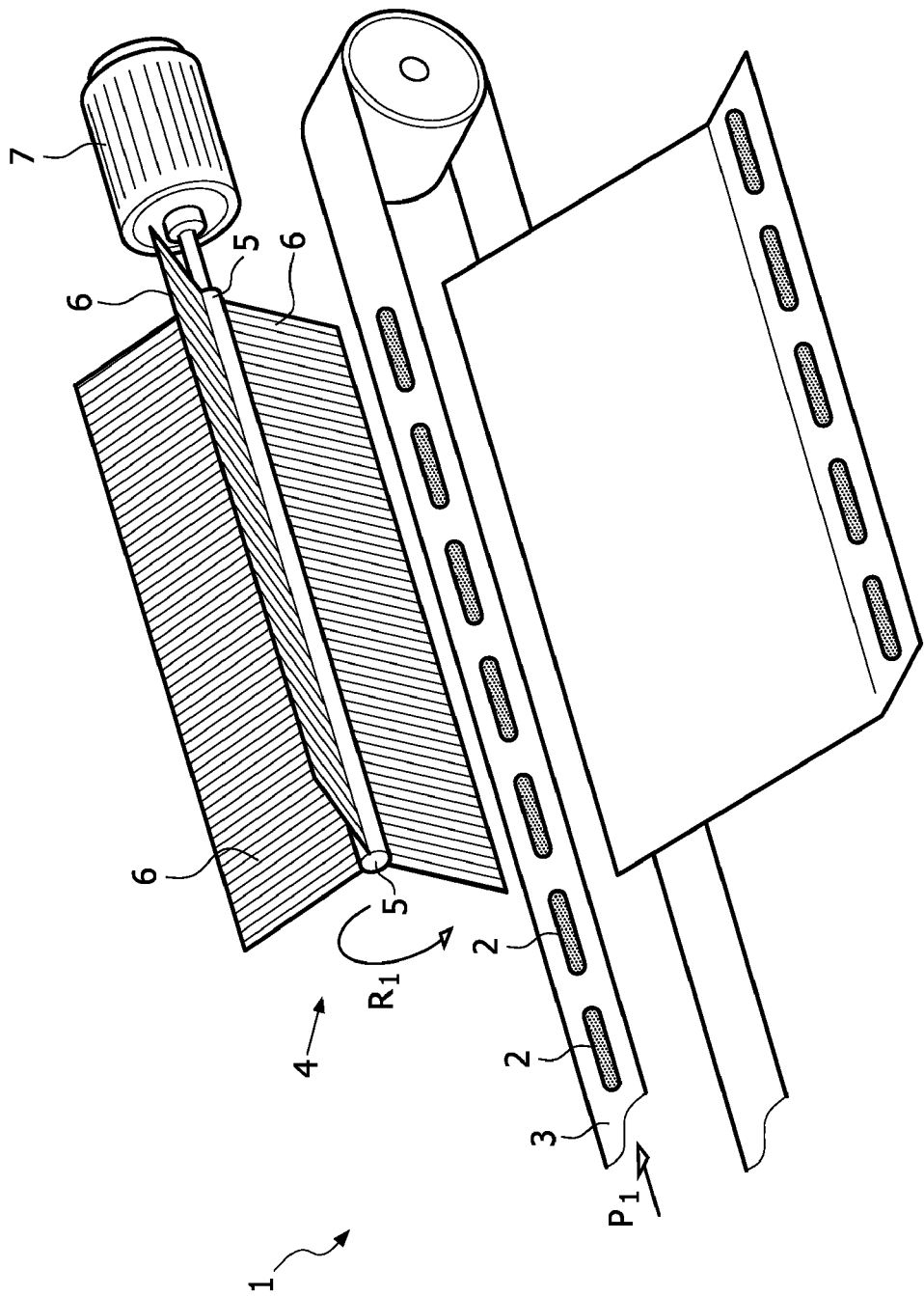
FIG. 1 shows a perspective view of a device according to the invention.

FIG. 1 shows a schematically represented device 1 for transferring sausages 2 which are supplied by means of an endless conveyor belt 3 in a direction $P_1$. A transfer means 4 is disposed above conveyor belt 3 such that when transfer means 4 are rotated in a direction $R_1$ the sausages 2 lying on conveyor belt 3 under transfer means 4 are urged laterally from conveyor belt 3. Transfer means 4 are provided with a central rotation shaft 5 on which three contact surfaces 6 are radially mounted. Upon rotation in the direction $R_1$ a following contact surface 6 will in each case then engage a row of sausages 2 and push it laterally from conveyor belt 3. Depending on the length of contact surfaces 6, the length of sausages 2 and the mutual distance between successive sausages 2 lying in a row, it is also possible for only a single sausage 2 to be transferred per processing stroke. The central rotation shaft 5 of transfer means 4 is driven by an electric motor 7. Once they have been pushed laterally from conveyor belt 3, sausages 2 are for instance discharged laterally via a guide.

Figure 2A:
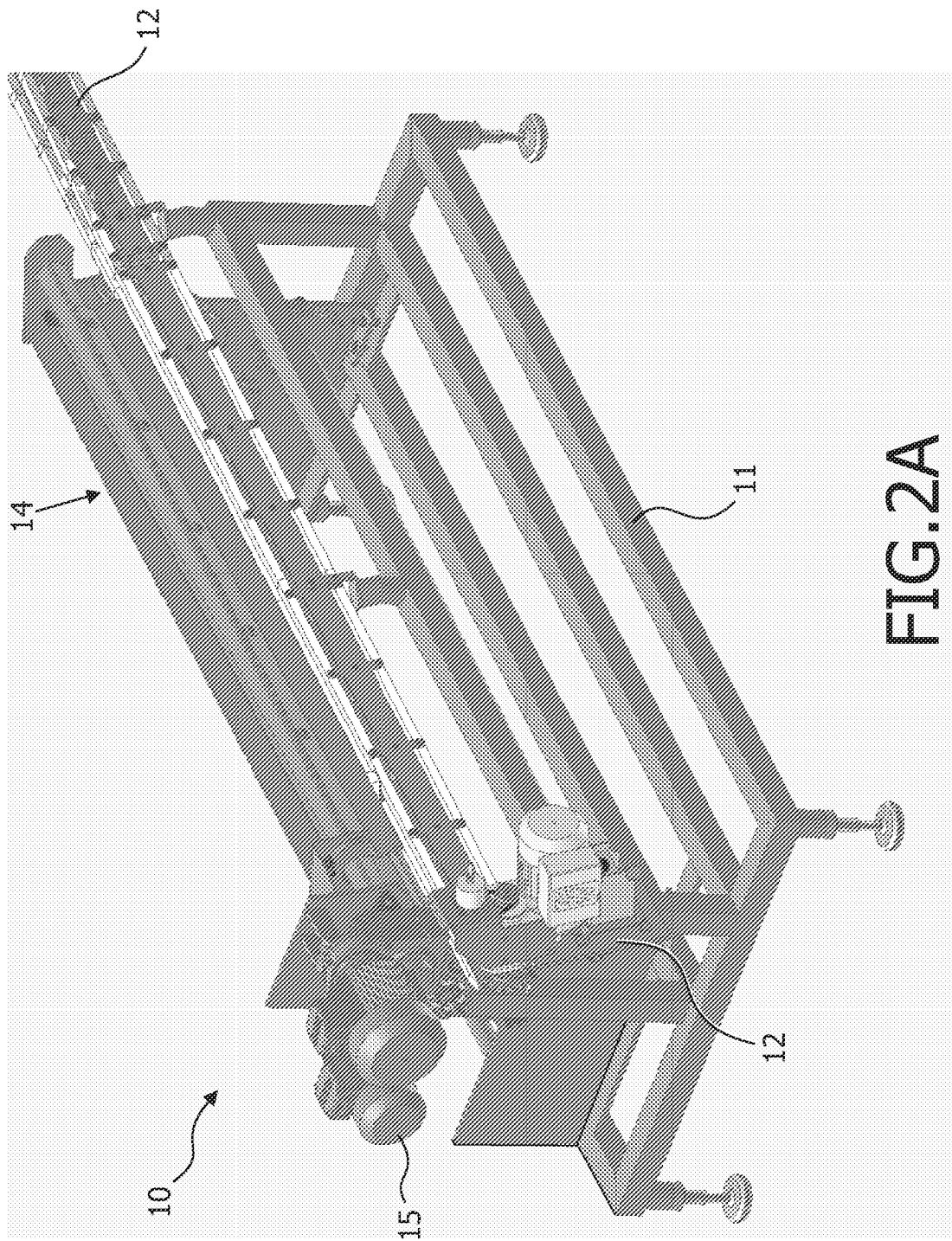
FIG. 2A is a perspective view of an alternative embodiment variant of the device according to the invention.

FIG. 2A shows an alternative embodiment variant of a device 10 for transferring elongate food products. Device 10 is provided with a frame 11 supporting a conveyor 12. Conveyor 12 is driven by an electric motor 13. Disposed above conveyor 12 is a transfer means 14 which is likewise supported by frame 11. Transfer means 14 is also provided with a separate electric motor 15. For a good adjustment of the operation of electric motor 12 and electric motor 14, these motors 12, 14 are synchronized.

Figure 2B:
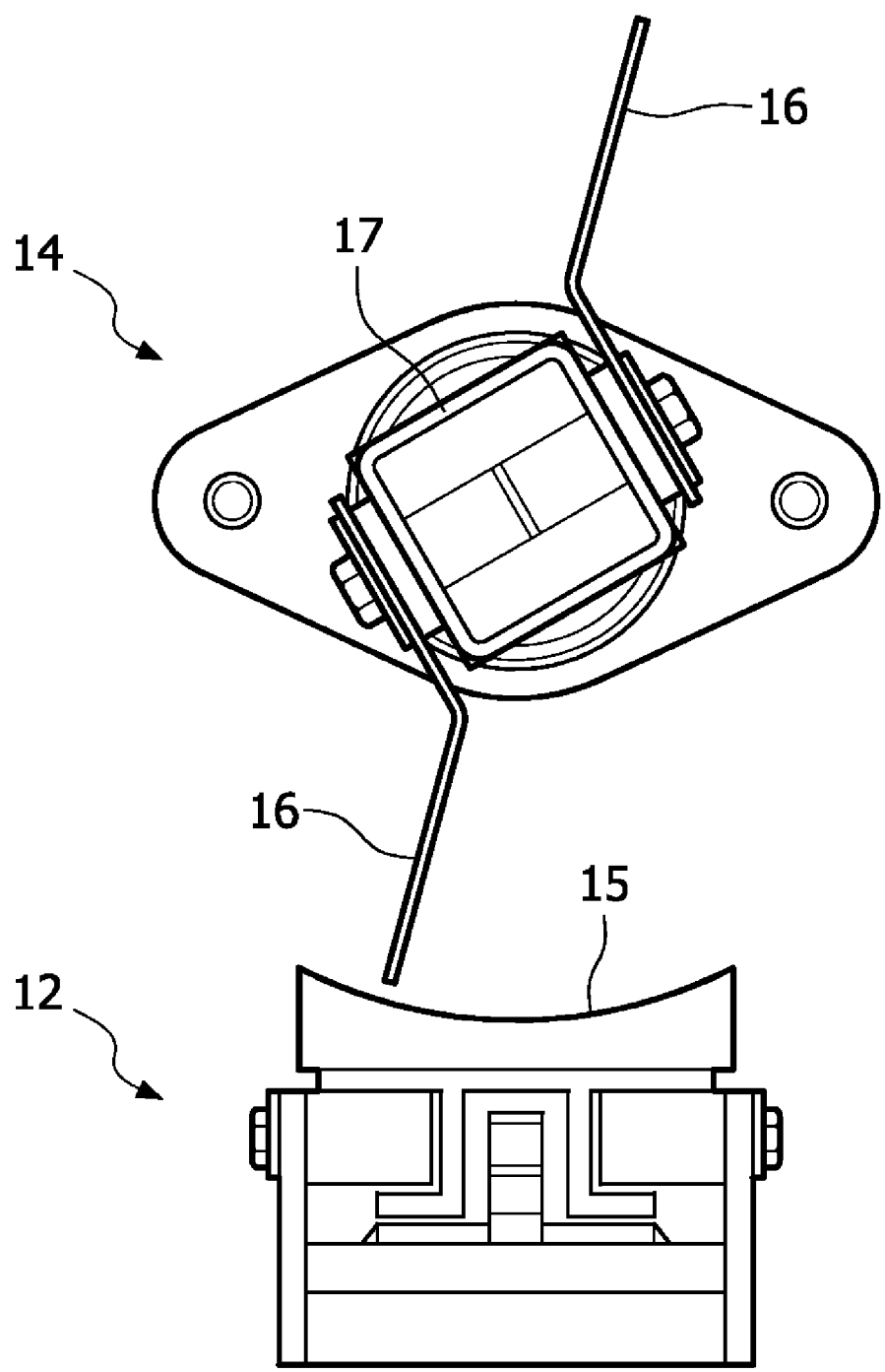
FIG. 2B shows a cross-section through a part of the device of FIG. 2A.

FIG. 2B shows a cross-section through a part of conveyor 12 and an upper part of transfer means 14. The carrying surface 15 of the conveyor has a circle segment-shaped geometry, whereby the food products co-displaced by conveyor 12 will lie in stable manner on conveyor 12. In the embodiment variant shown here transfer means 12 is provided with two radially protruding contact surfaces 16 which are mounted on a tubular profile 17.

What is claimed is:

1. Device for transferring elongate products, comprising:
   a carrier with a carrying surface for supporting a row of elongate products, and
   a displaceable transfer means provided with a least one contact surface for urging at least one elongate product from the carrier, wherein the at least one contact surface of the transfer means is pivotally displaceable and the axis of rotation of the pivoting of the contact surface is parallel to the carrying surface of the row of elongate food products to be transferred, characterized in that the device is dimensioned for transferring elongate food products, and the axis of rotation of the pivoting of the contact surface is positioned above the carrier so that the contact surface urge the elongate food product from the carrier and wherein the carrying surface of the carrier has the form of a segment of a circle perpendicular to the axis of rotation.

2. Device as claimed in claim 1, characterized in that a contact surface extends radially relative to the rotation axis.

3. Device as claimed in claim 1, characterized in that the transfer means is provided with a plurality of contact surfaces extending radially in different directions relative to a common rotation axis.

4. Device as claimed in claim 3, characterized in that the mutual angle between the successive contact surfaces extending radially from the common rotation axis is identical.

5. Device as claimed in claim 1, characterized in that the carrier comprises a feed conveyor for longitudinal displacement of elongate food products.

6. Device as claimed in claim 5, characterized in that the feed conveyor is an endless conveyor belt.

7. Device as claimed in claim 5, characterized in that the drive of the transfer means and the drive of the feed conveyor are synchronized.

8. Device as claimed in claim 1, characterized in that the least one contact surface is displaceable in only one direction of rotation.

9. Device as claimed in claim 1, characterized in that the transfer means is provided with an electrical drive.

10. Device as claimed in claim 1, characterized in that the device is also provided with collecting means for collecting elongate food products urged from the carrier by the transfer means.

11. The device as claimed in claim 1, characterized in that the carrying surface of the carrier has the form of a segment of a circle perpendicularly to the axis of rotation.

12. Method for transferring elongate products, comprising the processing steps of:
   A) supplying elongate products lying in a row to the carrying surface of a carrier, and
   B) urging at least one of a row of supplied products in a lateral direction from the carrying surface by means of a pivotable transfer means, wherein a contact surface of the transfer means makes a pivoting movement around an axis of rotation, which axis of rotation is parallel to the row of elongate products lying on the carrier, characterized in that the method is transferring elongate food products, to move during step B) the elongate products along a segment of a circle perpendicular to the axis of rotation over the carrying surface of the carrier.

13. Method as claimed in claim 12, characterized in that the transfer means is moved in only a single rotation direction around the axis of rotation for successive transfer operations.

14. Method as claimed in claim 12, characterized in that the food products urged from the carrier are collected by collecting means and positioned.

15. The method as claimed in claim 12 characterized in that the carrier comprises an endless conveyor belt.

\* \* \* \* \*